(12) United States Patent
Namur

(10) Patent No.: US 9,084,952 B2
(45) Date of Patent: *Jul. 21, 2015

(54) DEVICE FOR THE TREATMENT OF WATER, IN PARTICULAR A FILTER DEVICE, AND CARTRIDGE

(75) Inventor: Marc Namur, Darmstadt (DE)

(73) Assignee: BRITA GMBH, Taunusstein (DE)

( * ) Notice: Subject to any disclaimer, the term of this patent is extended or adjusted under 35 U.S.C. 154(b) by 569 days.

This patent is subject to a terminal disclaimer.

(21) Appl. No.: 12/449,730

(22) PCT Filed: Mar. 20, 2008

(86) PCT No.: PCT/EP2008/053344
§ 371 (c)(1),
(2), (4) Date: Aug. 24, 2009

(87) PCT Pub. No.: WO2008/122496
PCT Pub. Date: Oct. 16, 2008

(65) Prior Publication Data
US 2010/0307964 A1     Dec. 9, 2010

(30) Foreign Application Priority Data

Apr. 5, 2007 (DE) .......................... 10 2007 017 388

(51) Int. Cl.
*B01D 24/00* (2006.01)
*B01D 27/02* (2006.01)
*B01D 35/30* (2006.01)
*B01D 29/00* (2006.01)
*B01D 35/02* (2006.01)
*B01D 21/24* (2006.01)
(Continued)

(52) U.S. Cl.
CPC ........ *B01D 35/147* (2013.01); *B01D 2201/302* (2013.01); *B01D 2201/4023* (2013.01); *C02F 1/001* (2013.01); *C02F 2201/002* (2013.01); *C02F 2307/02* (2013.01)

(58) Field of Classification Search
USPC ......... 210/418, 232, 236, 237, 238, 390, 420, 210/421, 135, 234, 235, 248, 282, 444, 130, 210/209, 169, 97, 424; 70/266, 229, 230; 239/97
See application file for complete search history.

(56) References Cited

U.S. PATENT DOCUMENTS 2,338,291 A    1/1944 McIntosh
3,508,657 A *  4/1970 Cooper ........................ 210/90
(Continued)

FOREIGN PATENT DOCUMENTS

DE    2216149 A1    10/1972
EP    0 887 100 A1  12/1998
(Continued)

*Primary Examiner* — Allison Fitzsimmons
*Assistant Examiner* — Clare Perrin
(74) *Attorney, Agent, or Firm* — Hudak, Shunk & Farine Co. LPA

(57) ABSTRACT

A device for the treatment of water, in particular a filter device. The device has a cartridge which has a container for receiving treatment agents for water, particularly for receiving filter agents, and a connection head arranged on the container. In addition, a connection element is provided which has a recess for the connection head. At least one locking shaft is provided with which the connection head can be fixed in the connection element. The locking shaft is rotatably mounted and can be rotated from a locking position to an unlocking position and back again. A cartridge with a recess in the connection head is provided.

23 Claims, 21 Drawing Sheets

(51) Int. Cl.
　　*B01D 24/38*　　(2006.01)
　　*B01D 25/30*　　(2006.01)
　　*B01D 29/88*　　(2006.01)
　　*B01D 33/70*　　(2006.01)
　　*B01D 35/147*　(2006.01)
　　*B01D 35/153*　(2006.01)
　　*B01D 27/00*　　(2006.01)
　　*C02F 1/00*　　(2006.01)

(56) References Cited

U.S. PATENT DOCUMENTS

| | | | | |
|---|---|---|---|---|
| 3,856,421 | A | * | 12/1974 | Nogler .......................... 403/118 |
| 4,032,451 | A | * | 6/1977 | Rosaen ......................... 210/232 |
| 4,493,343 | A | | 1/1985 | Arnold et al. |
| 5,114,572 | A | * | 5/1992 | Hunter et al. ................. 210/120 |
| 5,342,519 | A | * | 8/1994 | Friedmann et al. ........... 210/232 |
| 5,653,871 | A | | 8/1997 | Thomsen |
| 6,645,376 | B2 | | 11/2003 | Marioni |
| 6,712,961 | B2 | * | 3/2004 | Chauquet ................. 210/167.21 |
| 2003/0015464 | A1 | | 1/2003 | Marioni |
| 2003/0164324 | A1 | | 9/2003 | Chauquet |
| 2004/0035776 | A1 | * | 2/2004 | Coleman ....................... 210/232 |
| 2006/0113240 | A1 | * | 6/2006 | Burrows et al. .............. 210/420 |
| 2006/0213821 | A1 | * | 9/2006 | Choi et al. .................... 210/136 |
| 2007/0227959 | A1 | * | 10/2007 | Sinur et al. .................... 210/232 |

FOREIGN PATENT DOCUMENTS

| | | |
|---|---|---|
| GB | 1393181 A | 5/1975 |
| WO | 0183078 A | 11/2001 |
| WO | WO 2005/077490 A1 | 8/2005 |

\* cited by examiner

DEVICE FOR THE TREATMENT OF WATER, IN PARTICULAR A FILTER DEVICE, AND CARTRIDGE

FIELD OF THE INVENTION

The invention concerns a device for treatment of water, especially a filter device, with a cartridge, which has a container to receive treatment agents for water, especially to receive filter means, and a connection head arranged on the container, and with a connection element, which comprises a seat for the connection head. The invention also relates to a cartridge, especially a filter cartridge.

BACKGROUND OF THE INVENTION

By water treatment is meant, in addition to filtration, also the measured placement of substances in the water. The placement of substances can also be combined with filtration of the water.

By filter cartridges are meant, first of all, those which have a sievelike form for mechanical filtration. Secondly, by filter cartridges is also meant those which contain, in addition to a sievelike form, at least one filter medium, e.g., in granulate form, which serves for the chemical and/or mechanical removal and/or lessening of organic and/or inorganic impurities. Such filter cartridges thus enable a nonmechanical filtration, which can be combined with a mechanical filtration. These filter cartridges are used for optimization of water, by which is meant mechanical and/or nonmechanical filtration. This includes, e.g., the softening and decalcifying of drinking water.

Filtration can be pressure operated, i.e., carried out with excess pressure or partial vacuum, or it can be gravity operated.

From U.S. Pat. No. 5,653,871 is known a filter device with filter cartridge and with a connection element. The filter cartridge has a cylindrical connection head, which is inserted from below into the seat of the connection element. In the inserted condition, the inlet opening and the supply opening on the one side are situated opposite the outlet opening and the drain opening on the other side. To fix the connection head and thus the cartridge, a kind of bayonet closure is provided in the connection element. The bayonet closure, however, has the drawback that the cartridge and/or the connection element have to be twisted as a whole when inserted, which requires a great deal of effort on the one hand, and can damage the gaskets arranged in the area of the supply and drainage opening, on the other.

SUMMARY OF THE INVENTION

It is therefore the problem of the invention to create a device for treatment of water in which the joining of the seat element and the cartridge is possible in easy fashion and both components are reliably joined together.

The problem is solved with a device for water treatment in which at least one locking shaft is provided, to which the connection head in the connection element can be secured, while the locking shaft is rotationally mounted and can be turned from a locking position into an unlocked position and vice versa.

The benefit is that the connection head is simply inserted in the connection element, so that the locking shaft then only needs to be turned into the locking position. The locking shaft then fixes the connection head in the connection element, so that the cartridge cannot drop out downwards. To remove the cartridge, the locking shaft is turned to its unlocked position and the cartridge is pulled out from the connection element.

Preferably, the locking shaft is arranged in the connection element. The connection head preferably has at least one recess, with which the locking shaft engages in its locking position. Thanks to the interaction of a rotational locking shaft and a recess in the connection head, a simple and effective fixation of the connection head is achieved, without having to turn the cartridge and/or the connection element when installing or removing the cartridge.

Preferably, the locking shaft extends perpendicular to the lengthwise axis of the cartridge. Thus, the locking shaft lies perpendicular to the insertion direction, so that the filter cartridge is held reliably in the connection element and the locking shaft cannot slip out in the locking position.

An arrangement of the locking shaft parallel to the lengthwise axis is recommended when, for space reasons, the handle of the locking shaft has to be placed on top. In this configuration, the handle can also be fashioned, for example, as a turn ring.

The locking shaft preferably has at least one locking segment.

According to a first embodiment, the locking segment can comprise an eccentric segment. The eccentric segment is a segment of the shaft which projects relative to the outer cylindrical surface of the locking shaft. This eccentric segment can be combined with a corresponding offset, so that the axis of the eccentric segment is set off from the axis of the locking shaft. The eccentric segment can likewise be cylindrical.

An eccentric segment has the advantage of engaging with the recess of the connection head by both form fitting and frictional fitting. Thanks to the eccentric segment, a force can be exerted on the connection head so that it is held by clamping in the seat element. Furthermore, it is possible in this way to also shift the connection head slightly in the lengthwise direction and/or in the transverse direction of the cartridge if the locking shaft extends perpendicular to the lengthwise axis of the cartridge.

According to another embodiment, the locking segment only has a recess, without the shaft projecting relative to the outer cylindrical contour in the locking segment. Such a locking shaft can be inserted into a single-piece seat element. The installing of this locking shaft is easier than that of a locking shaft with eccentric segment.

It is furthermore advantageous for the locking shaft to take on additional functions, or for additional functions to be integrated in the locking shaft.

Preferably the connection element has an inlet channel and an outlet channel.

It is preferred that the locking shaft be arranged in the inlet channel and/or outlet channel, and the locking shaft has a valve segment in the inlet channel and/or outlet channel. By means of such a valve segment, the supply or drainage [of water] can be blocked, which is of advantage when the cartridge needs to be replaced. This prevents water from accidentally flowing when no filter cartridge is placed in the connection element, but the connection element is already connected to the water supply. It is furthermore preferred that the locking segment of the locking shaft be appropriately arranged relative to the valve segment, so that the blocking of inlet channel and/or outlet channel takes place precisely when the locking shaft is in the unlocked position.

According to one embodiment, the valve segment has a connection channel which joins together the two branches of the inlet channel and/or outlet channel.

According to one particular embodiment, the connection channel consists of a partial annular groove, which extends across a segment of the outer circumference of the locking shaft.

Preferably, the partial annular groove is surrounded by at least one sealing element. Thus, the entire partial annular groove is sealed.

Preferably, the locking shaft has two valve segments, namely, one valve segment for the inlet channel and one valve segment for the outlet channel. Preferably, the locking segment is arranged between the two valve segments. The locking shaft can be a single piece or at least two pieces, preferably three pieces.

Depending on the design of the connection element and the arrangement of inlet and outlet openings on the connection head, the two valve segments can also be arranged next to each other. The locking segment is situated next to the pair of valve segments.

In addition, the locking shaft can have a bypass mechanism. This bypass mechanism is of advantage when the machine to which the water treatment device is connected is not supposed to be shut off when the cartridge is being replaced. The bypass mechanism allows the machine to continue running, which means that the flow of water need not be interrupted. The bypass mechanism will be used when the locking position is relinquished.

Preferably, the bypass mechanism has a bypass channel, which extends inside the locking shaft and emerges into the valve segments of the locking shaft.

For this purpose, the valve segment is provided with at least one additional sealing element on either side.

The recess has at least one recess surface in the connection head. The recess can preferably be profiled, and the recess has at least two recess surfaces which are displaced in height in the lengthwise direction of the recess. This means that, for a preferably round or partly circular recess, at least two recess surfaces are arranged next to each other, having two different radii of curvature, and the midpoints of the radii of curvature are displaced relative to each other.

Thanks to the profiling of the recess, one can produce a characterization of the cartridges, so that the user can identify by means of a particular key which active media are present in the cartridge. The user knows at once the particular application for which the cartridge is suited and designed, so that cartridges for other purposes cannot be installed mistakenly in the connection element. Thus, the cartridges cannot be confused for each other.

Preferably, the locking segment is adapted by its locking surface or surfaces to the contour of such a profiled recess. This makes sure that only that cartridge whose recess matches the locking surface of the locking shaft can be installed and reliably secured.

Preferably, the connection element has a catch, which engages with the locking shaft in the locking position and secures the locking shaft. This catch has the advantage that, in the unlocked position, when the bypass mechanism is active, the locking shaft cannot be rotated accidentally, which would mean that inflowing water would pour into the seat of the connection element.

The catch is preferably designed so that, when the connection head is removed, it moves either automatically or by spring force into the blocking position.

The cartridge is characterized in that the connection head has at least one recess for engaging with a locking shaft.

Preferably, the recess in the connection head has at least one recess surface.

The recess can preferably be profiled. The recess preferably has two recess surfaces, which are arranged in the lengthwise direction of the recess and displaced in height.

BRIEF DESCRIPTION OF THE DRAWINGS

Sample embodiments of the invention shall now be explained more closely by means of the drawings. These show.

DETAILED DESCRIPTION OF THE INVENTION

Figure 1:
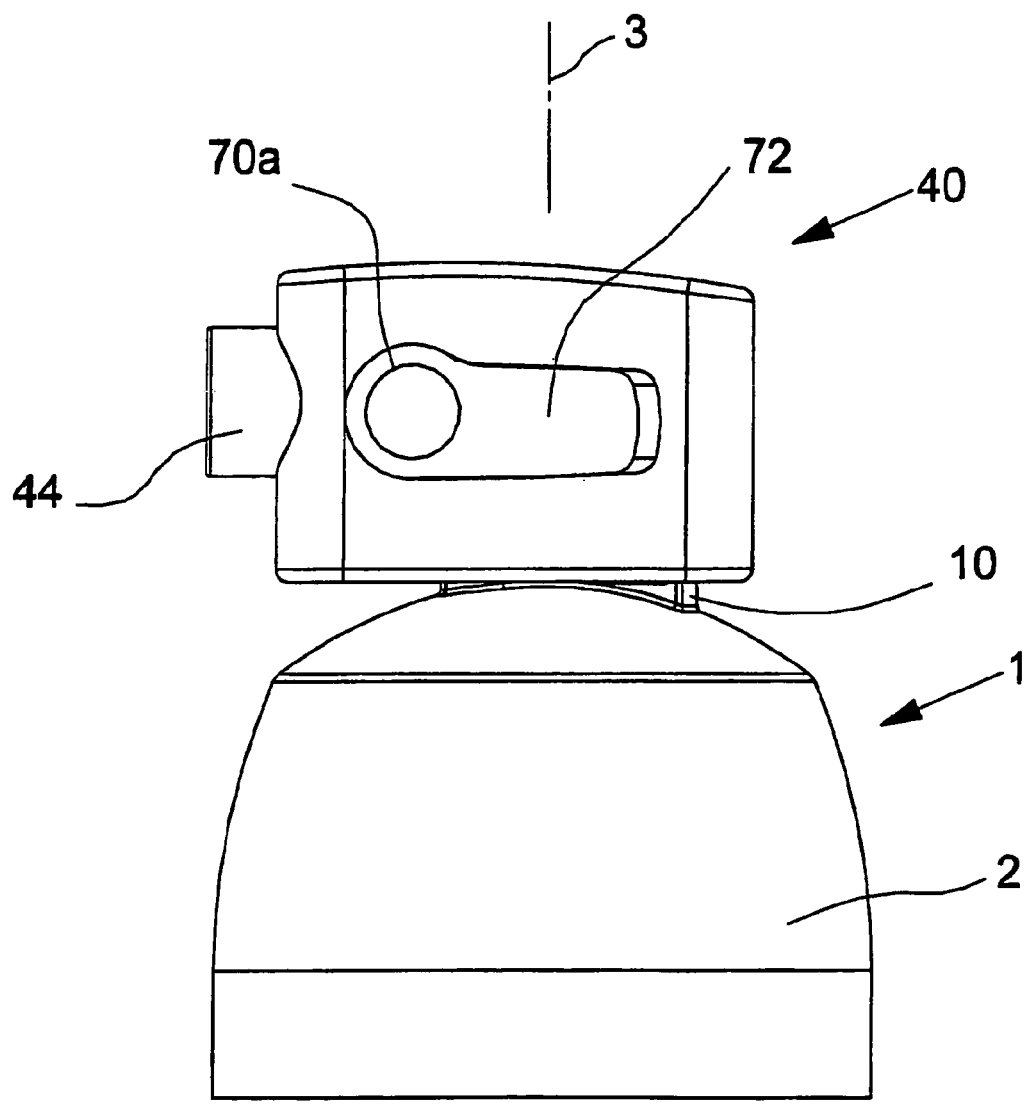
FIG. 1 a side view of the device.

In FIG. 1, a device for water treatment is shown in side view. The device has a cartridge 1 with a container 2 to receive water treatment agents, especially to receive filter means, while on the container 2 is arranged the connection head 10, which is inserted into the connection element 40. The connection element 40 provides the connection to a supply and a drain line, which is not shown in FIG. 1. Accordingly, the connection element 40 has an inlet fitting 42 (see FIG. 2) and an outlet fitting 44.

Perpendicular to the lengthwise axis 3 of the cartridge 1, a locking shaft 70a, b runs through the connection element 40, projecting to the outside beyond the outer wall of the connection element 40, where a lever-shaped handle 72 is arranged, by which the locking shaft 70a can be turned.

Figure 2:
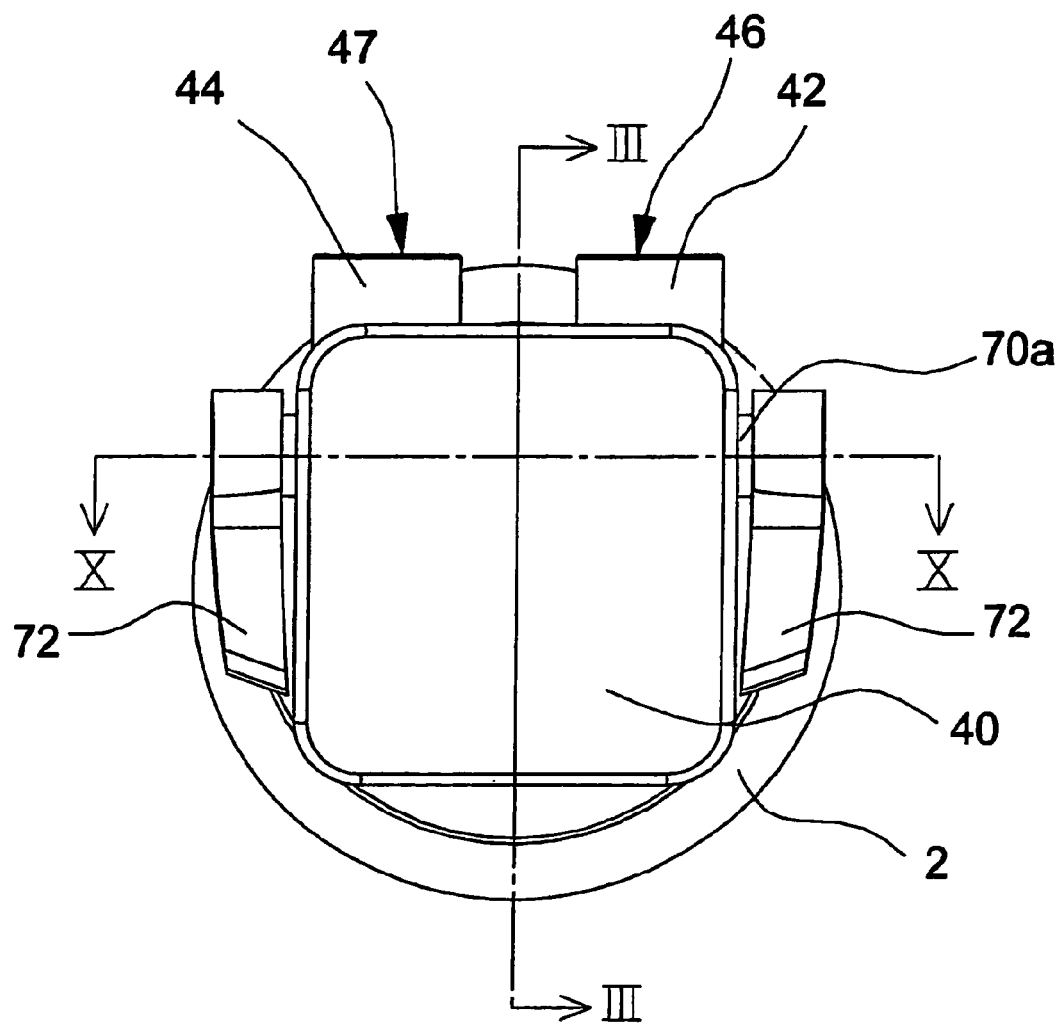
FIG. 2 a top view of the device shown in FIG. 1.

FIG. 2 shows the top view of the device presented in FIG. 1. The locking shaft 70a extends on both sides beyond the connection element 40 and has a handle 72 at either end.

Figure 3A:
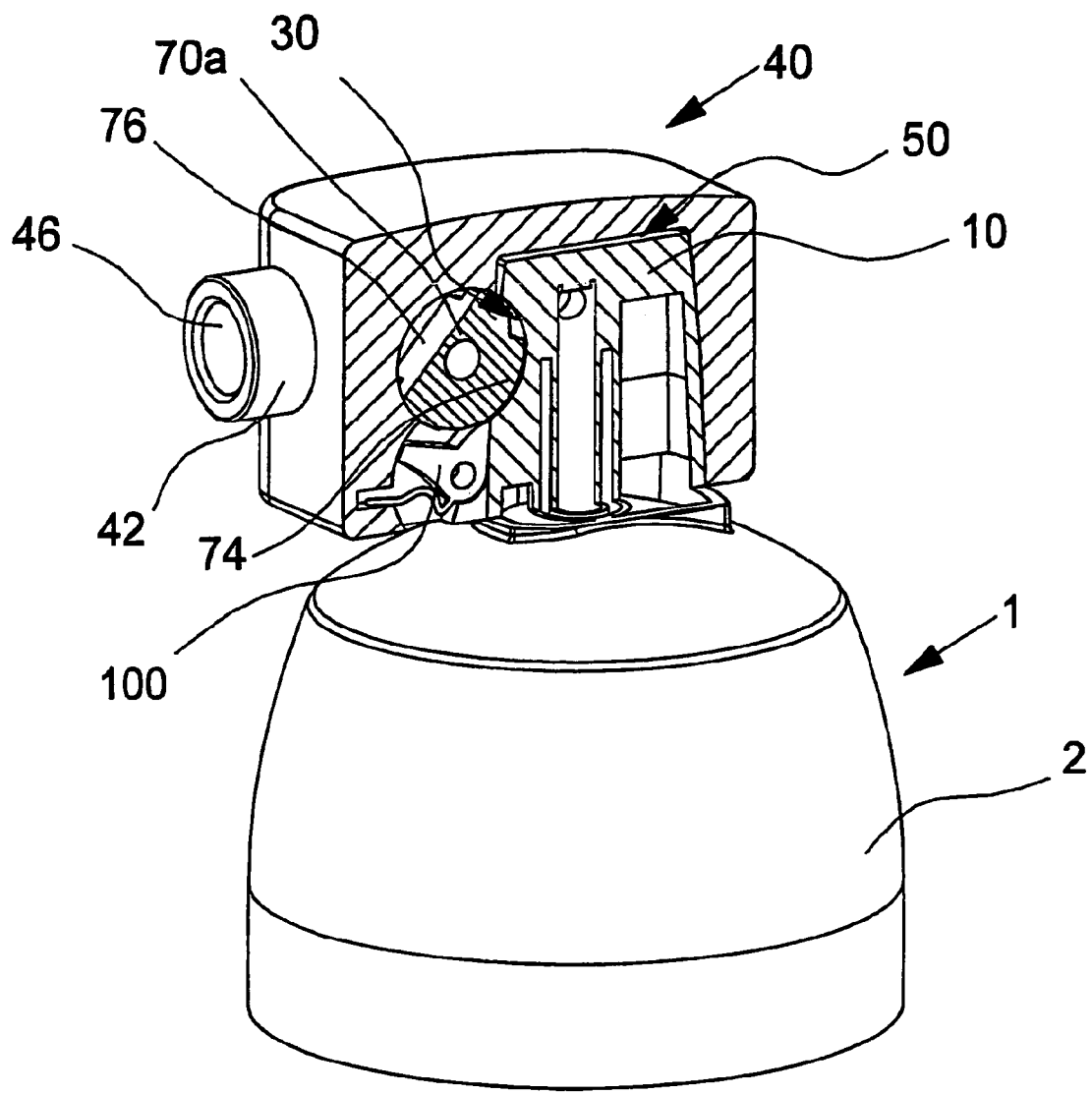
FIG. 3a a vertical section of connection head and connection element along line III-III in FIG. 2 with the locking shaft in the locking position.
Figure 4A:
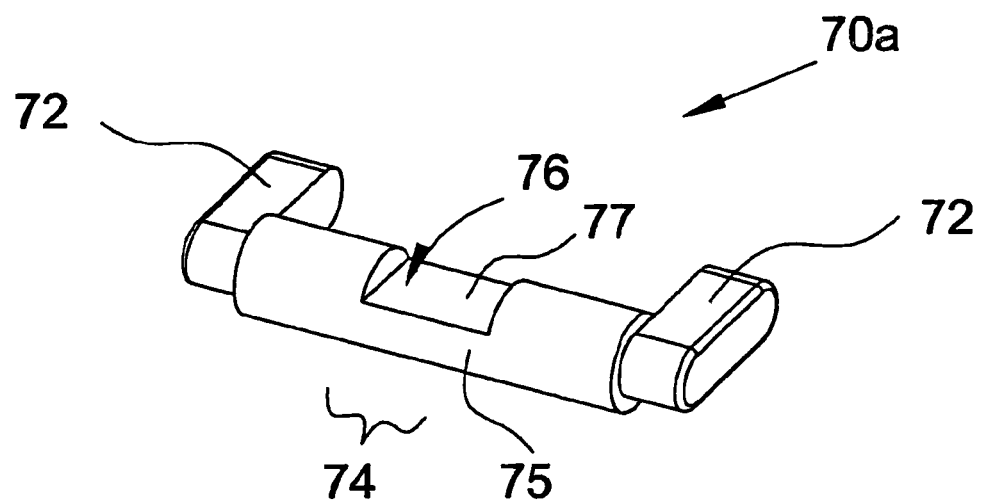
FIGS. 4a to 4c three different embodiments of the locking shaft according to a first embodiment.
Figure 4B:
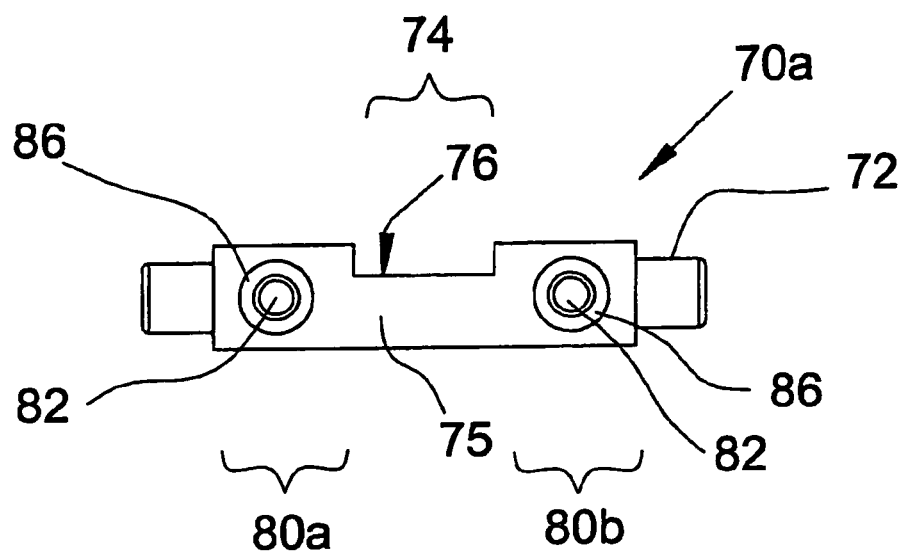
Figure 4C:
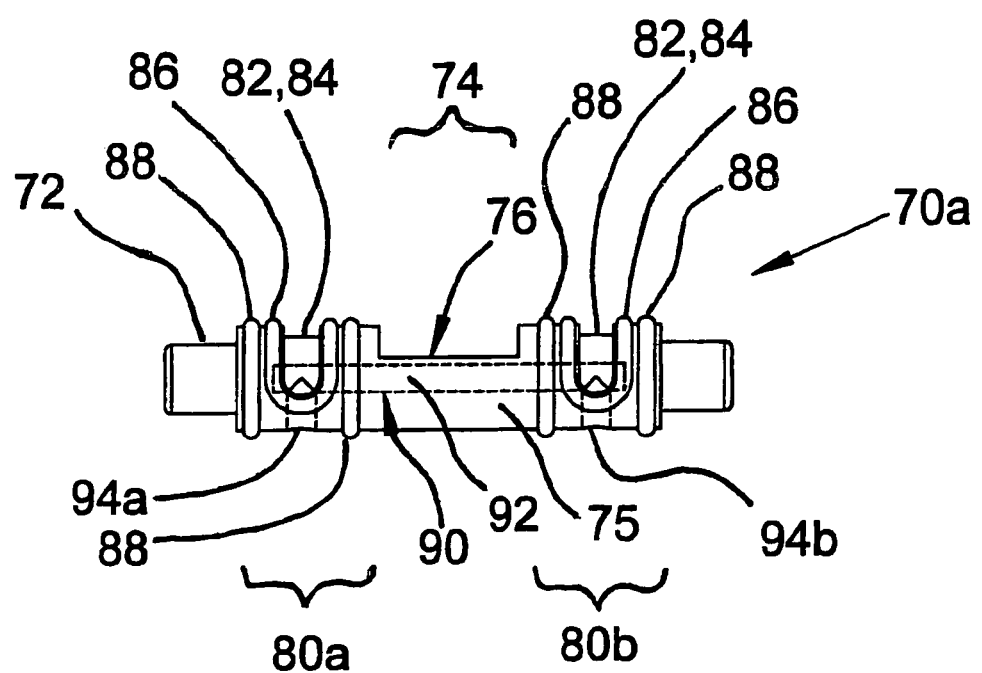
Figure 8:
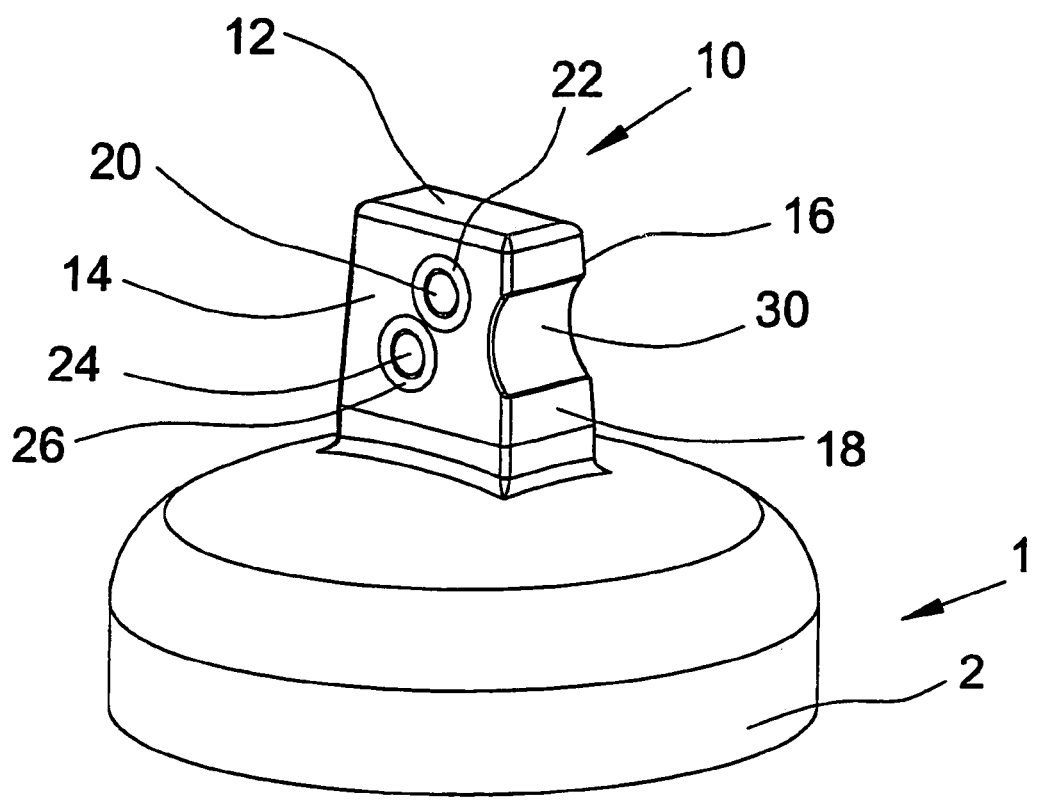
FIG. 8 a perspective representation of a cartridge according to a third embodiment.

FIG. 3a shows a vertical section along line III-III through the device shown in FIG. 2. The connection head 10, which is shown in perspective view in FIG. 8, is located in the seat 50 of the connection element 40. The locking shaft 70a, which is explained in detail in connection with FIGS. 4a to c, is located in the locking position. As can be seen, the locking shaft 70a has a locking segment 74, which engages with a recess 30 of the connection head 10. The recess 30 is basically in the form of part of a circle and shall be explained in connection with FIGS. 8 and 9a, b.

The recess 30 extends perpendicular to the lengthwise axis 3 of the device over the entire width of the connection head 10, which is held in the locking position by the locking shaft 70a through form fitting. The connection head 10 in the locking position cannot be pulled out downward. Since, as a rule, the connection element 40 is mounted in fixed position, the cartridge 1 hangs from the connection element 40. The strength of the locking shaft 70a and size of the recess 30 are designed for the weight of the cartridge 1, so that the cartridge 1 is held reliably and immovably in the connection element 40.

In FIG. 3a, there is further arranged underneath the locking shaft 70a a catch 100, which swivels into its release position when the connection head 10 is inserted.

Figure 3B:
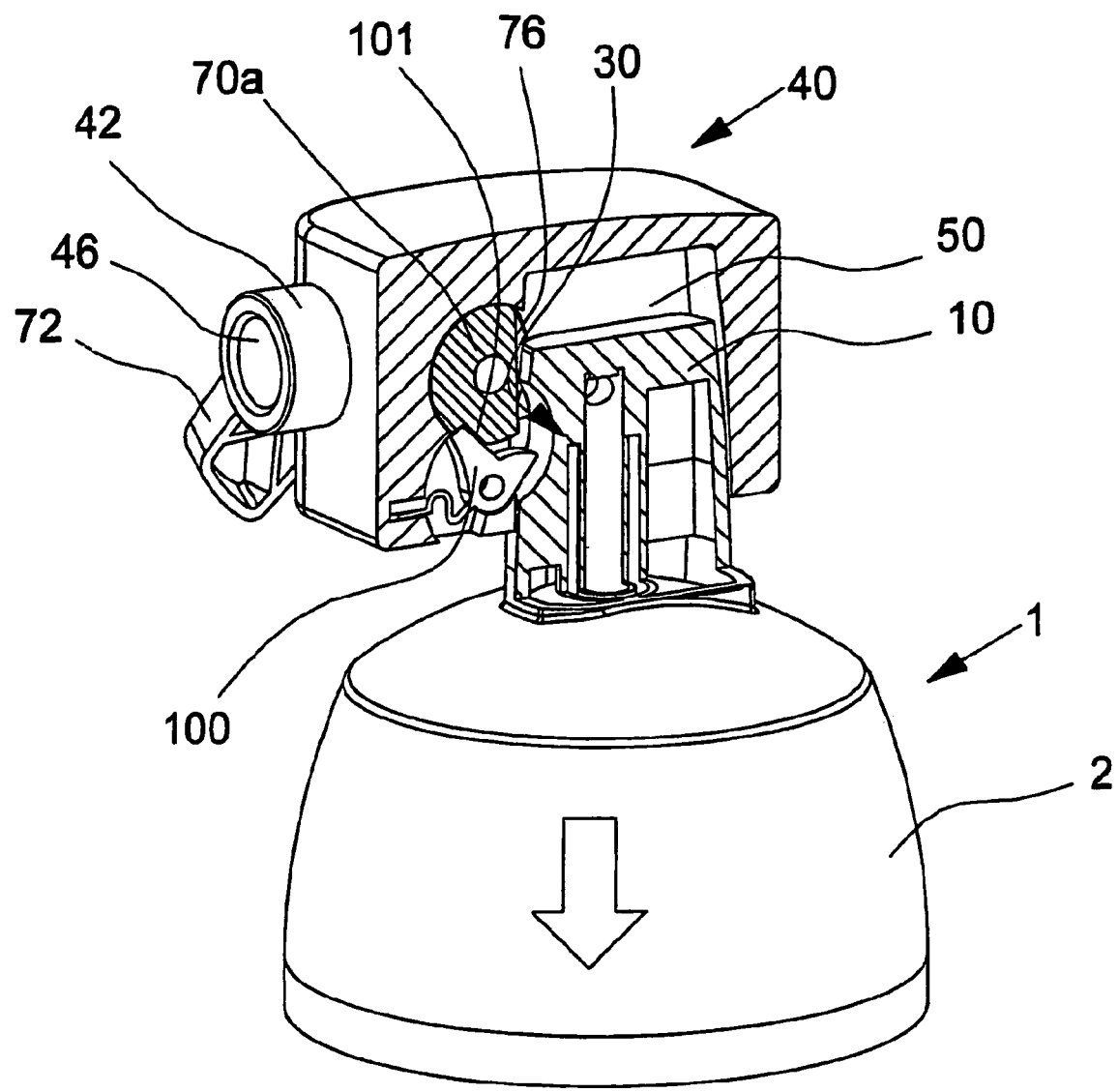
FIG. 3b a sectional view per FIG. 3a with the locking shaft in the unlocked position.

In FIG. 3b, the locking shaft 70a is in the unlocked position, with the recess 76 (see also FIG. 3a) of the locking segment 74 opposite the recess 30 of the connection head 10, so that the connection head 10 is released and can be pulled out downward from the connection element 40.

When the connection head 10 is pulled out, the catch 100 drops into its blocking position and engages with a notch 101 of the locking shaft 70a, which is thereby fixed in the unlocked position.

FIGS. 4a to c show three different embodiments of a locking shaft 70a. The locking shaft 70a consists of a cylindrical part, having in the locking segment 74 a recess 76 with flat bottom surface 77 and a cylindrical locking surface 75, as can also be seen in FIGS. 3a and b. At either end are located the handles 72. The length of the recess 76 is the same size as the width of the connection head 10.

FIG. 4b shows another configuration of this embodiment, in which there is provided a valve segment 80a, b at both sides next to the locking segment 74. The valve segments 80a, b are characterized in that they are arranged in the inlet channel 46 and in the outlet channel 47 of the connection element 40 (also see FIG. 11a,b) and have two connection channels 82.

The valve segments 80a, b have the task of releasing the inlet channel 46 and the outlet channel 47 when the locking shaft 70a is in the locking position, which is the case when the cartridge is also inserted in the seat element 40. In the unlocked position, the inlet channel 46 and the outlet channel 47 are blocked, so that the cartridge can be removed from the connection element 40 without the water being able to flow through and thus run uncontrolled out from the seat 50 of the connection element 40.

For this purpose, the two connection channels 82, which are bores made perpendicular to the shaft axis, are arranged according to the orientation of the recess 76. Around the opening of the connection channels 82, sealing elements 86, such as O-rings, are inserted into the surface of the locking shaft 70a.

FIG. 4c shows another configuration of the locking shaft 70a, in which the connection channel 82 is formed by a partial annular groove 84 in the valve segment 80a, b. Once again, a sealing element 86 such as an O-ring is arranged around the partial annular groove 84.

In the design shown in FIG. 4c, a bypass mechanism 90 is provided in addition, which has a bypass channel 92, extending in the lengthwise direction of the locking shaft 70a inside the locking shaft and having openings 94a, b in the region of the valve segments 80a, 80b. This design has the advantage that the inflow is not interrupted in the unlocked position, contrary to the design per FIG. 4b, but rather the water supplied can be led by the locking shaft 70a through the outlet channel 47. Thus, when changing cartridges, it is not necessary to interrupt the water flow. Machines which are connected to the water treatment device do not need to be shut off for this purpose.

For a seal at both sides of the connection channel 82 and the openings 94a, b, sealing elements 88 such as sealing rings are arranged, which close off the valve segments 80a, 80b.

Figure 4D:
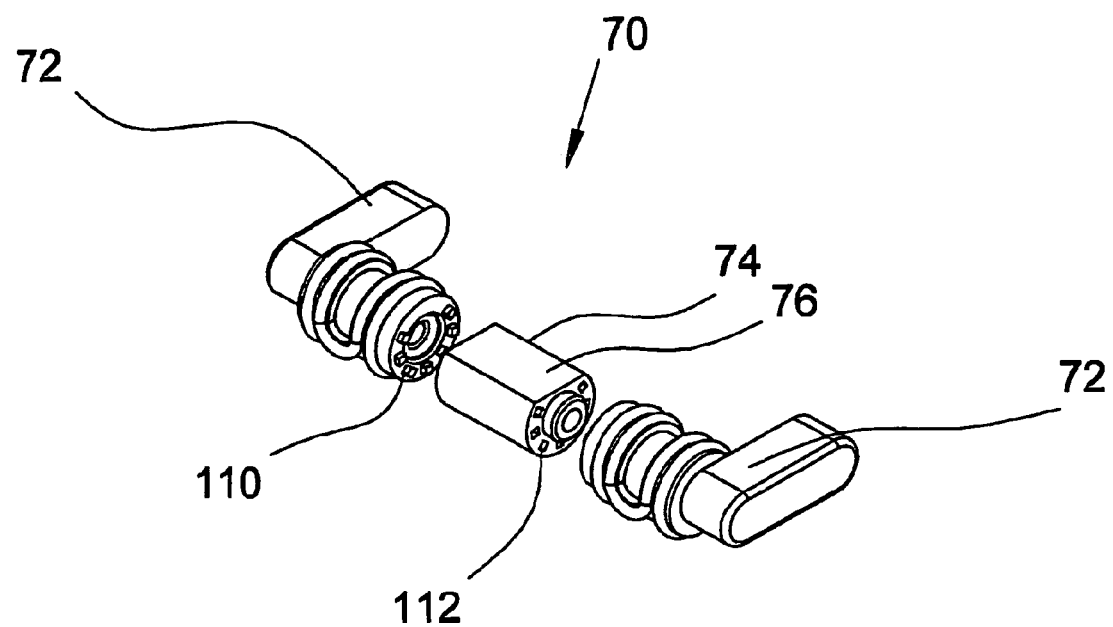
FIG. 4d another embodiment of the locking shaft.

In FIG. 4d, the locking shaft 70a shown in FIG. 4c is represented in perspective view. Instead of a single-piece design, the locking shaft 70a is formed of three pieces, and the three parts are joined by means of an insert system, consisting of pins 110 and insert openings 112. One places on the middle segment, comprising the locking segment 74 with the recess 76, the end pieces with the valve segments 80a, b and the handles 72. The multipiece locking shaft 70a facilitates the installation of the shaft.

Figure 5A:
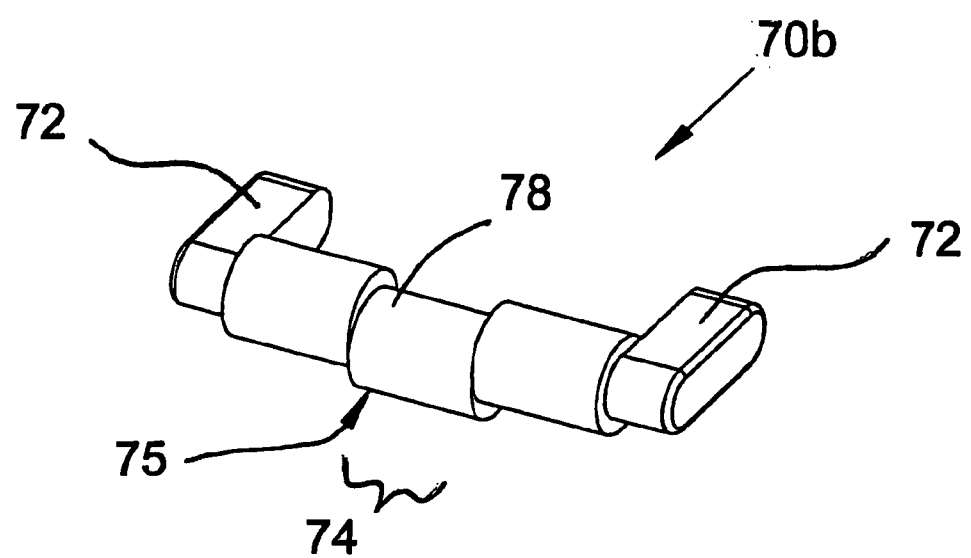
FIGS. 5a to 5c three different embodiments of the locking shaft according to a second embodiment.

FIG. 5a shows a second embodiment of a locking shaft 70b, differing from the locking shaft 70a per FIGS. 4a to c in that the locking shaft 74 has an eccentrically arranged segment 78 instead of a recess in the otherwise cylindrical shaft.

This eccentric segment 78 consists of a cylindrical or partly cylindrical segment, which in the locking position rotates into the recess 30 of the connection element 40 and holds the connection head not only by form fit, but also by friction fit. The eccentric segment 78 has the advantage that a force can be exerted on the connection head 10 when the locking segment 74 is rotated into the recess 30, so that the connection head 10 is drawn into the seat 50 of the connection element 40 and held there by clamping. When loosening the lock by turning in the opposite direction, the connection head 10 is forced out from the seat, which facilitates the removal of the cartridge 1 when replacing it.

Figure 5B:
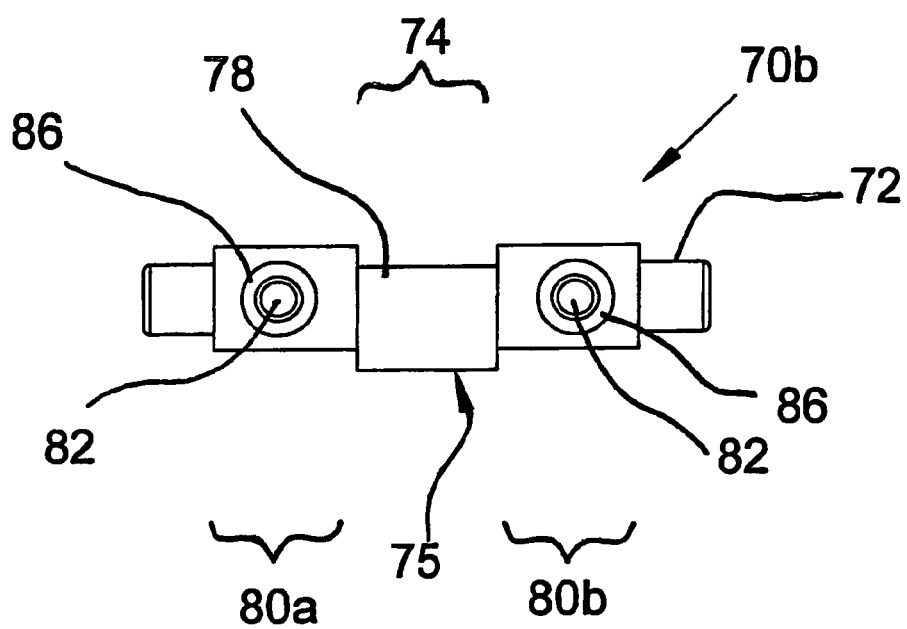
Figure 5C:
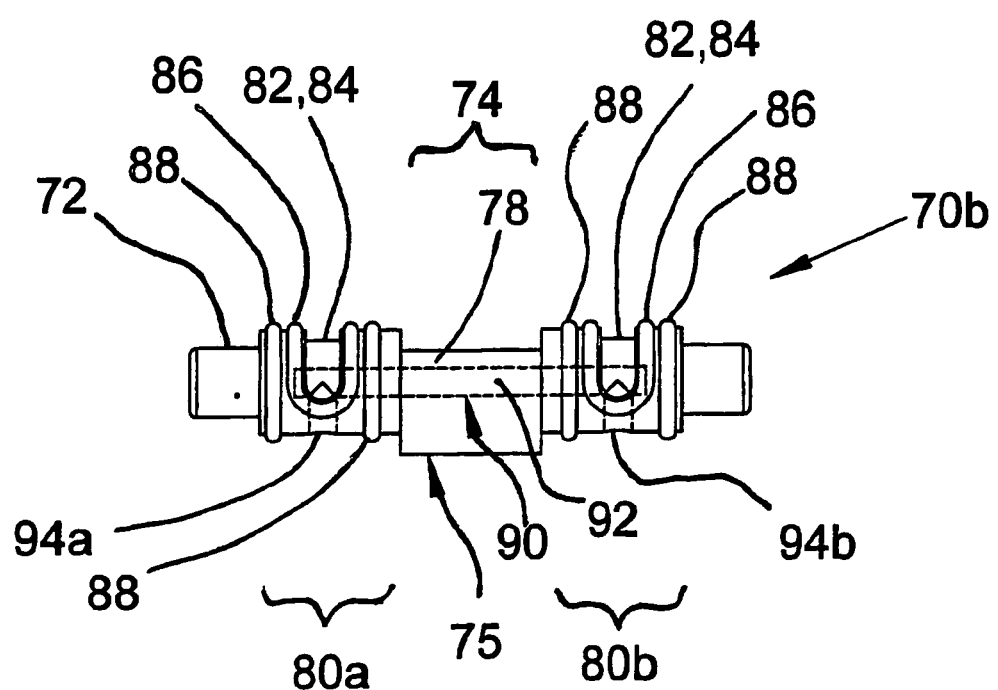

In FIGS. 5b and 5c, the locking shaft 70b is provided with additional features, such as the locking shaft 70a shown in FIGS. 4b and 4c. Accordingly, the locking shaft 70b can also have valve segments 80a, 80b, as well as a bypass mechanism 90.

The connection heads 10 can be configured in various ways. Sample shapes of connection heads 10 are shown in FIGS. 6, 7 and 8.

Figure 6:
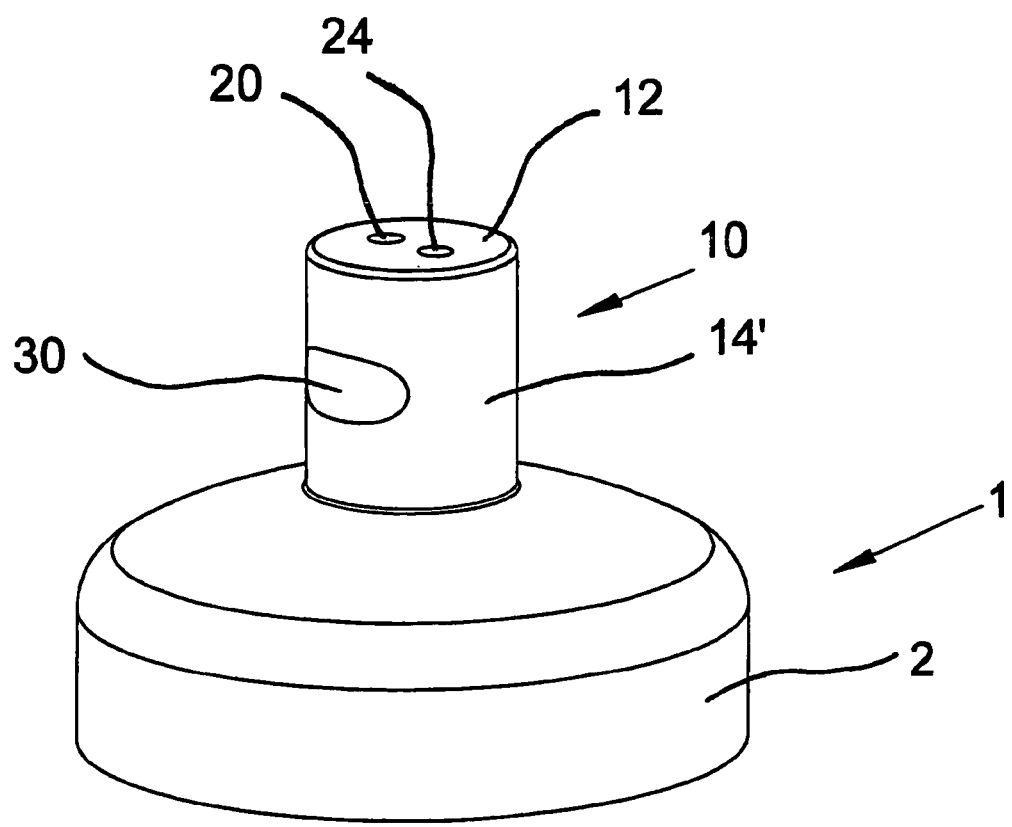
FIG. 6 a perspective representation of a cartridge according to a first embodiment.

In FIG. 6, the connection head 10 is cylindrical in shape, and the recess 30 is situated in the envelope surface 14' of the connection head 10. The inlet opening 20 and the outlet opening 24 are arranged in the end face 12. It is also possible to provide the inlet opening 20 and the outlet opening 24 on the envelope surface 14'.

Figure 7:
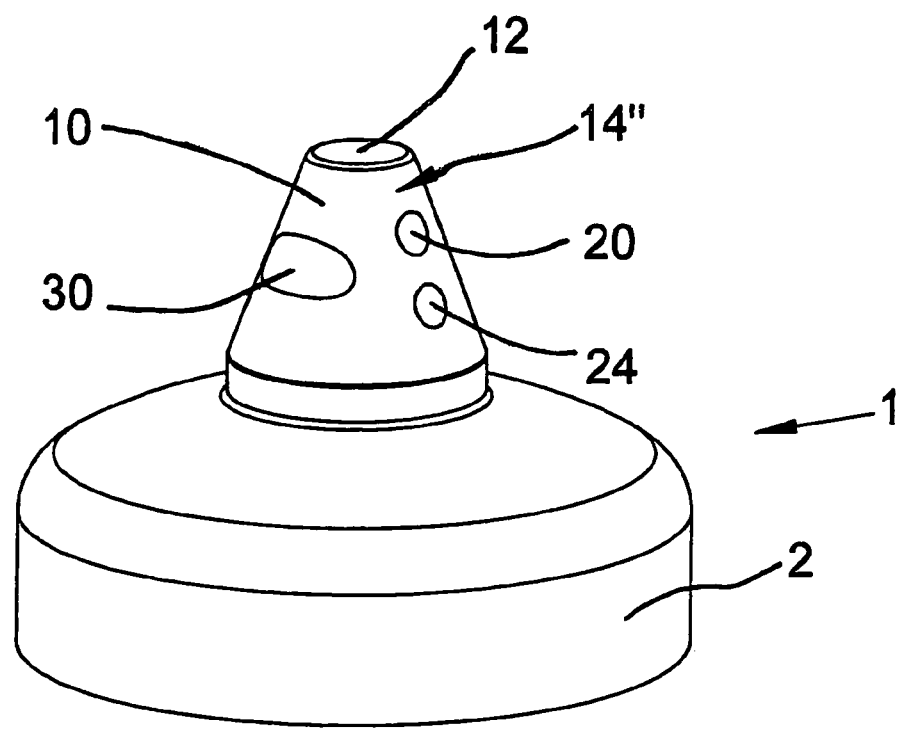
FIG. 7 a perspective representation of a cartridge according to a second embodiment.

FIG. 7 shows a truncated cone connection head 10. The inlet opening 20 and the outlet opening 24, as well as the recess 30, are located in the conical surface 14".

In FIG. 8, an embodiment is shown in which the connection head 10 is basically a cuboid, with the outer surfaces 14 and 16 inclined to the lengthwise axis 3, so that it is more easily introduced into the seat 50. The inlet opening 20 and the outlet opening 24, both of which are enclosed by sealing elements 22, 26, are located in the side surface 14, while the recess 30 is located in the narrow side surface 18. As can be seen, the recess 30 extends over the entire width of the connection head 10 and has a round contour.

Figure 9A:
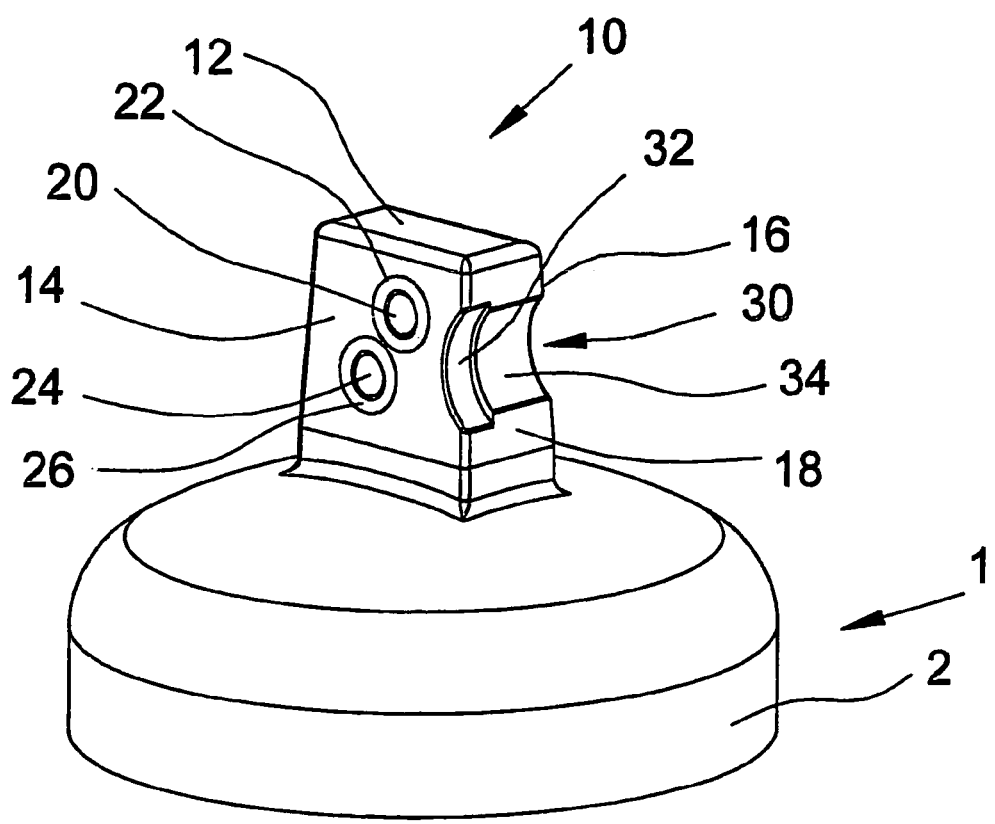
FIGS. 9a, b two perspective representations of a cartridge according to a fourth and fifth embodiment.

FIG. 9a shows another embodiment of the connection head 10, as represented in FIG. 8. The recess 30 unlike the configuration of FIG. 8 has two recess surfaces 32 and 34, which are arranged in the lengthwise direction of the recess 30 and displaced in height from each other. This means that the recess surface 32 lies lower than the recess surface 34. The radii of curvature are of different size and have a common midpoint.

Figure 9B:
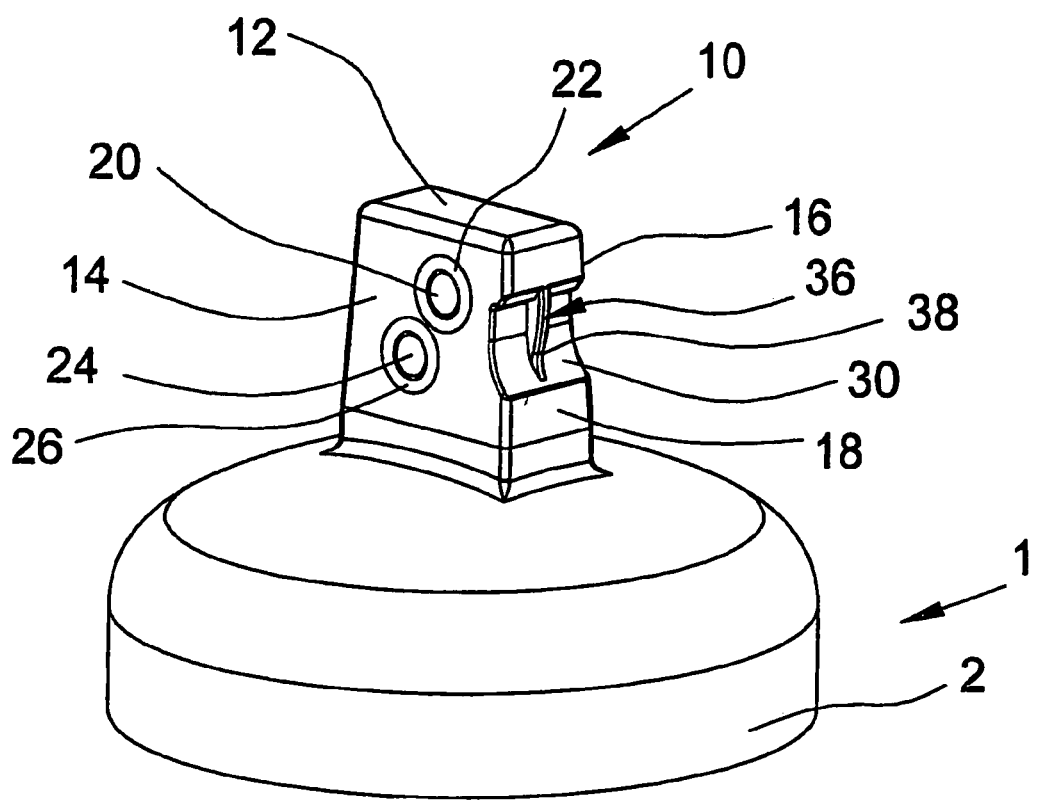

In FIG. 9b, another embodiment of the connection head 10 is shown. The recess 30 has a ridge 36, extending in the vertical direction. In the representation of FIG. 9b shown here, the ridge 36 is arranged centrally and has a curved end face 38. The ridge 36 has the advantage that any locking elements present along the entire path of removal of the cartridge can be managed so that the removal of the cartridge is not hindered. Furthermore, by positioning the ridge, specific matching up of head and cartridge can be achieved, so that only a particular type of cartridge can be inserted in a head.

The locking shaft 70a has locking surfaces 75a, b (see FIG. 10), which are attuned to the position and curvature of the recess surfaces 32 and 34. This configuration of the recess 30 offers the advantage that only those cartridges 1 can fit or be locked in the seat element 40 that are configured in accordance with the profiling of the locking surface of the locking shaft. In this way, it is made sure that only those cartridges which are intended for the particular purpose can be inserted.

This safety aspect is especially important when cartridges are available for different purposes and definite cartridges need to be used depending on the application purpose and it is necessary to preclude cartridges being confused with each other. A more extensive profiling of the recess 30 is possible. FIG. 9 merely shows one example of a possible profiling of the recess 30.

Figure 10:
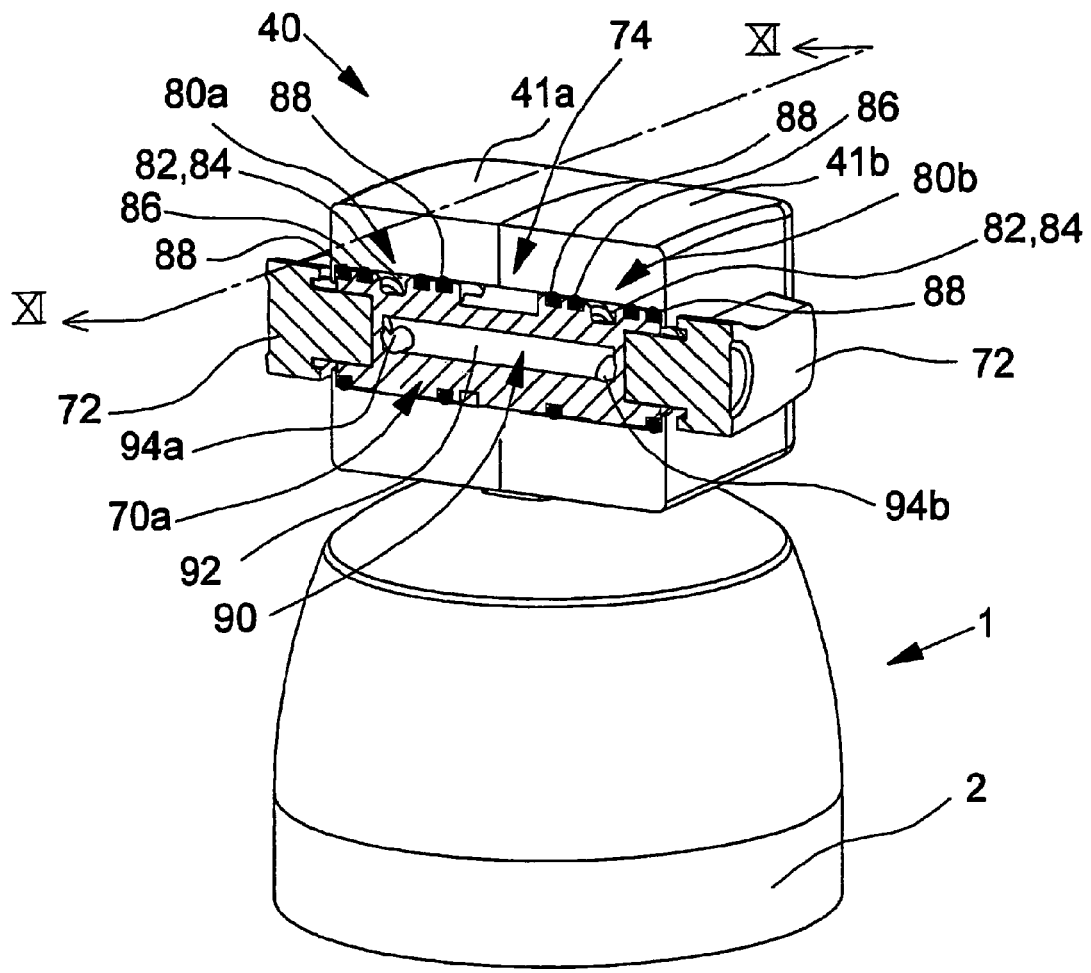
FIG. 10 a vertical section of connection head and connection element along line X-X in FIG. 2.

FIG. 10 shows a vertical section of connection head 10 and connection element 40 along line X-X in FIG. 2. Inside the connection element 40, made up of two structural parts 41a and 41b, is arranged a locking shaft 70a, which has valve segments 80a, b and a bypass mechanism 90, as is shown in FIG. 4c. This is a hollow shaft, terminating at the end in the two handles 72.

Between the two valve segments 80a and 80b is placed the locking segment 74 with the recess 76, while the locking surface of the locking segment 74 is provided with two different locking surfaces 75a, b with a height offset, being adapted to the profiling of the recess 30 per FIG. 9.

The two valve segments 80a, b have partial annular grooves 84, which are encompassed by sealing elements 86. In the position shown here, the locking shaft 70a is in its locking position, so that the two connection channels 82 open up the inlet and outlet channels.

Inside the hollow shaft is found the bypass mechanism 90 with the bypass channel 92, extending through the locking shaft 70a in the lengthwise direction and having openings 94a, b in the region of the valve segments 80a, b. The two openings 94a, b point downward and are thus not in flow contact with the inlet channel 46 or the outlet channel 47. The bypass mechanism 90 in the depicted position of the locking shaft 70a is inactivated.

When unlocking occurs by turning the locking shaft 70a, these openings 94a and 94b are brought into communication with the inlet channel 46 and the outlet channel 47, so that the incoming water can be diverted by the locking shaft 70a and returned, without the water being able to escape from the seat 50 when the cartridge 1 has been removed from the seat 50.

Figure 11A:
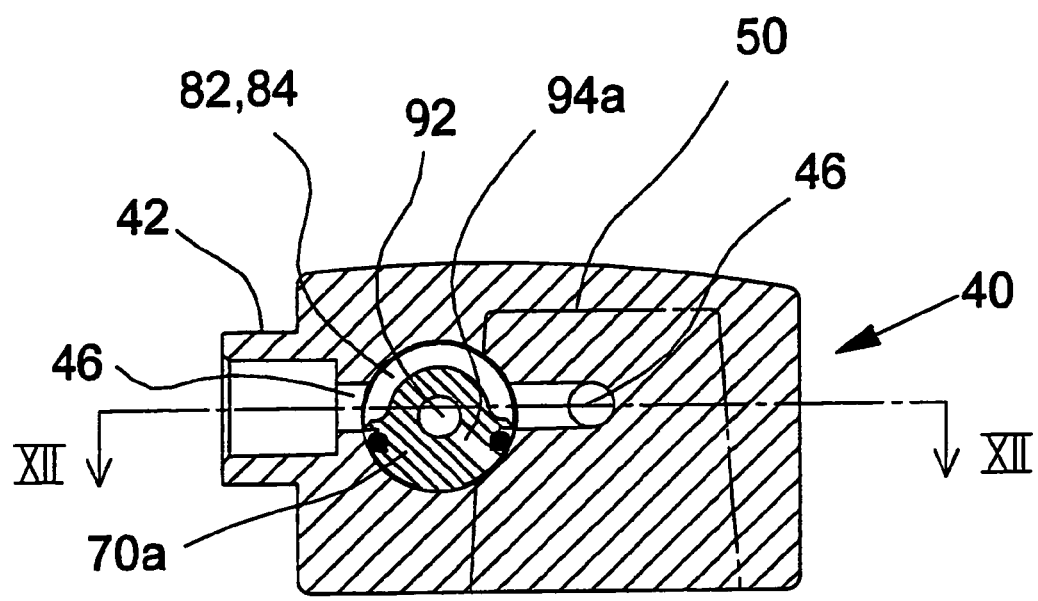
FIGS. 11a, b two vertical sections through the device shown in FIG. 10 along line XI-XI and FIGS. 12a, b two horizontal sections through the device shown in FIG. 11a, b along line XII-XII.
Figure 11B:
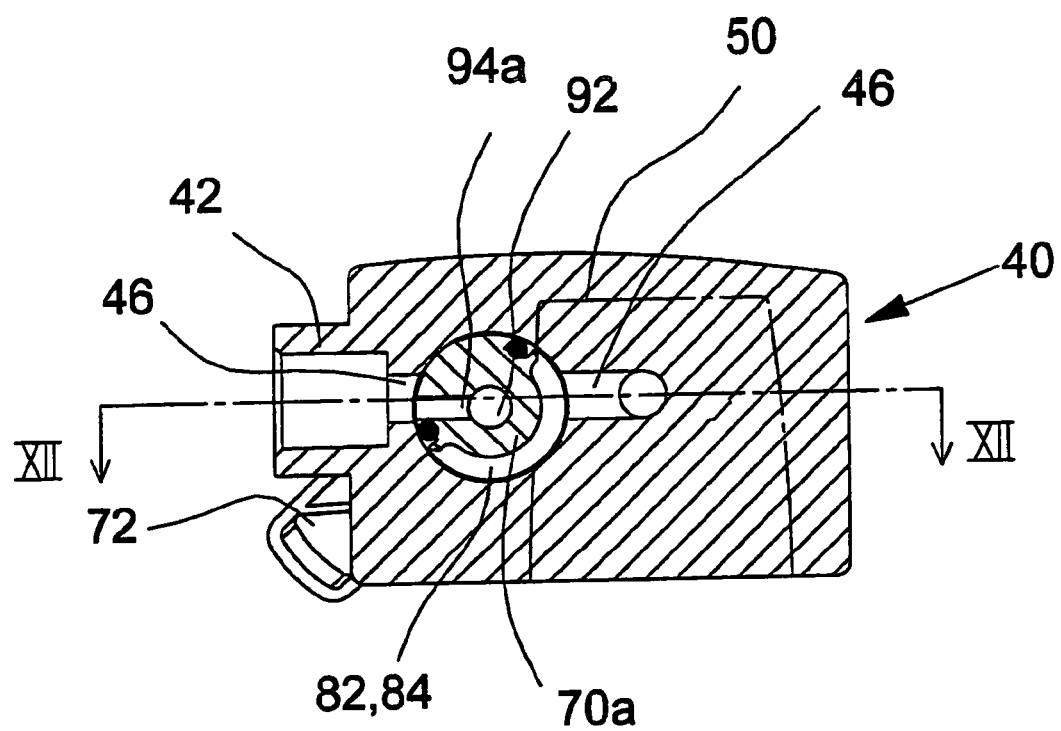

In FIGS. 11a and 11b, sections along line XI-XI in FIG. 10 are represented for the two positions of the locking shaft 70a, the cartridge 1 being omitted for sake of clarity. In FIG. 11a, one can see that the connection channel 82 forms the connection between the two adjacent segments of the inlet channel 46, so that the water being filtered can be conducted into the seat element 40 and taken to the connection head 10 of the cartridge 1. In this process, the locking segment 74 engages with the recess 30 of the connection head 10.

In FIG. 11b, the locking shaft 70a is in the unlocked position, in which the recess 76 frees up the connection head 10. Now the openings 94a and 94b (not shown) emerge into the inlet channel 46 and outlet channel 47 (not visible), so that the incoming water gets into the bypass mechanism 90 and thus the bypass channel 92 and is diverted directly by the outlet channel 47, not shown in the figure. In this way, one avoids having to shut off the incoming water or having an uncontrolled escape in the region of the seat 50 when the cartridge 1 is not present.

Figure 12A:
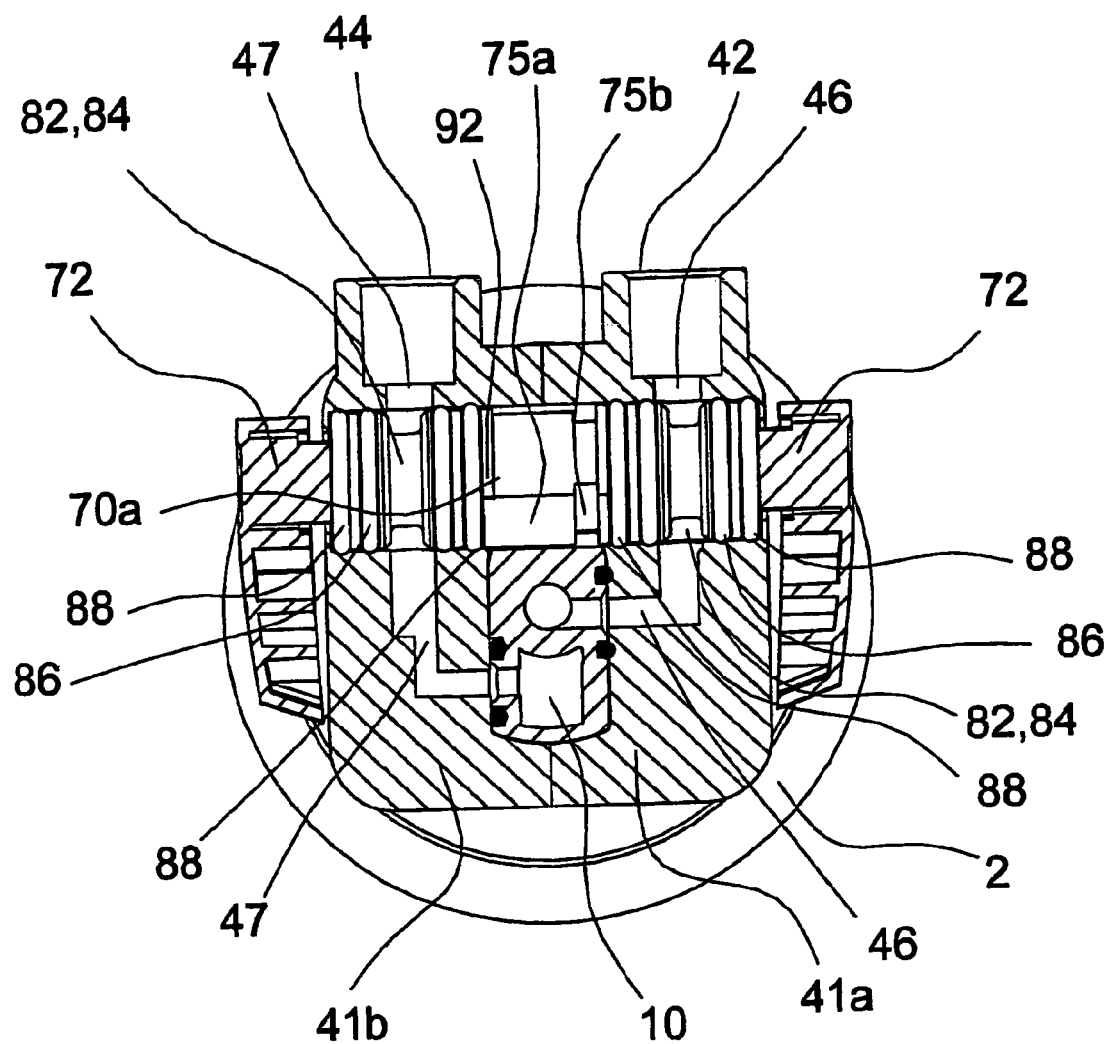

FIG. 12a shows a horizontal section through the device per FIG. 11a. The connection channels 82 of the locking shaft 70a connect the two branches of the inlet channel 46 and the outlet channel 47, both branches being formed by the channel segments upstream and down-stream of the locking shaft 70a. Also depicted are the two locking surfaces 75a, 75b, which are compatible with the corresponding recess surfaces 32 and 34.

Figure 12B:
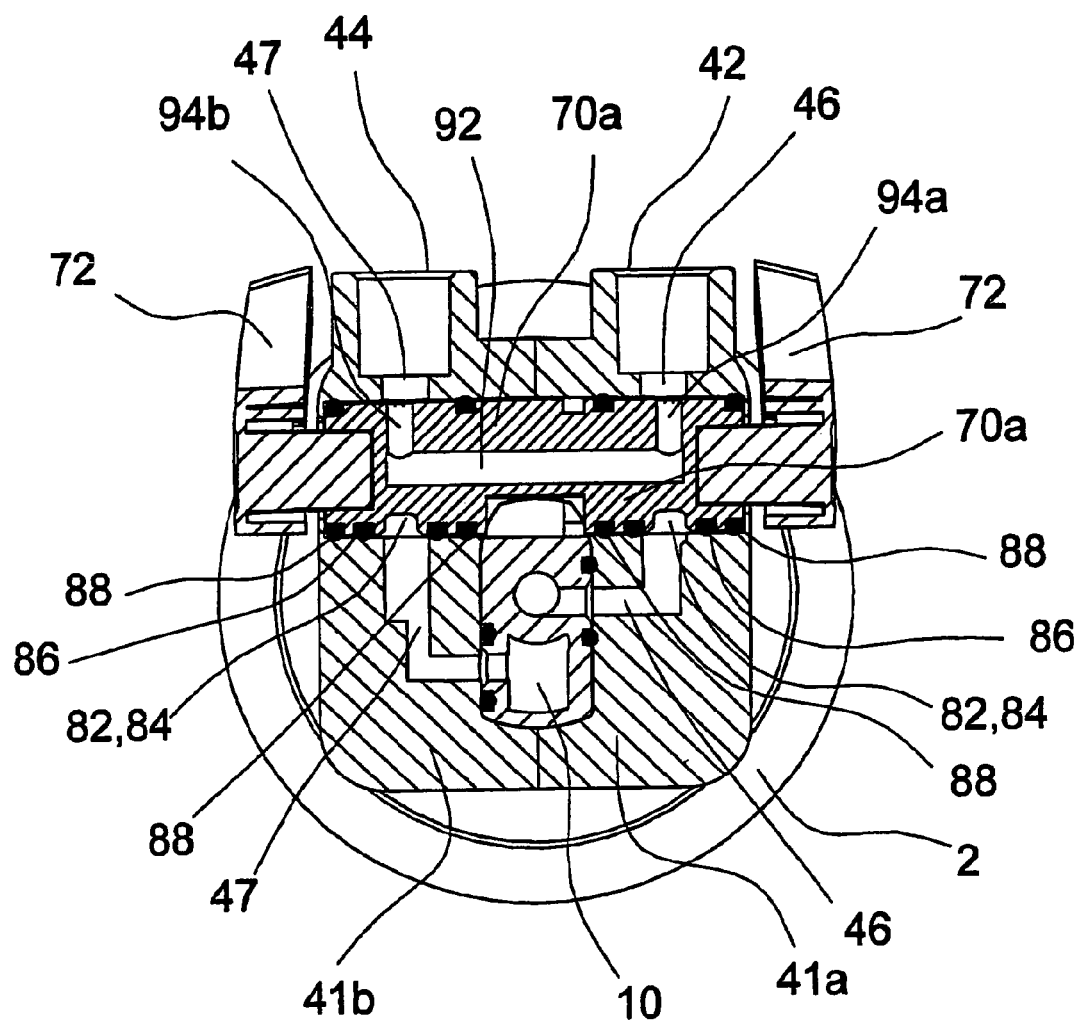

FIG. 12b shows a horizontal section through the device shown in FIG. 11b, in which the bypass mechanism 90 joins the inlet fitting 42 to the outlet fitting 44.

LIST OF REFERENCE SYMBOLS 1 cartridge
2 container
3 lengthwise axis
10 connection head
12 end face
14 outer surface
14' envelope surface
14" conical surface
16 outer surface
18 side surface
20 inlet opening
22 sealing element
24 outlet opening
26 sealing element
30 recess
32 recess surface
34 recess surface
36 ridge
38 end face
40 connection element
41a, 41b structural part
42 inlet fitting
44 outlet fitting
46 inlet channel
47 outlet channel
50 seat
70a, b locking shaft
72 handle
74 locking segment
75, 75a, b locking surface
76 recess
77 bottom surface
78 eccentric segment
80a, b valve segment
82 connection channel
84 partial annular groove
86 sealing element
88 sealing element
90 bypass mechanism
92 bypass channel
94a, b opening
100 catch
101 notch
110 pin

What is claimed is:
1. A filter device for water treatment, comprising:
a cartridge, which has a container to receive treatment agents for water; and a male connection head arranged on the container, and a connection element, which comprises a female receptacle for inserting the male connection head in the connection element, wherein at least one locking shaft is integrally provided on the connection element, with which the male connection head can be secured in the female receptacle of the connection element, wherein the locking shaft is rotatably journaled and can be turned from a locking position into an unlocked position and vice versa, wherein the connection element has an inlet channel and an outlet channel, and the locking shaft is arranged in the a) inlet channel or b) outlet channel or c) both the inlet channel and outlet channel, and the locking shaft has a valve segment in a) the inlet channel or in b) the outlet channel or in c) both the inlet channel and outlet channel.

2. The device per claim 1, wherein the locking shaft is arranged in the connection element, and the male connection head has at least one recess, with which the locking shaft engages in its locking position.

3. The device per claim 1, wherein the locking shaft extends perpendicular or parallel to a lengthwise axis of the cartridge.

4. The device per claim 1, wherein the locking shaft has a locking segment.

5. The device per claim 4, wherein the locking segment is an eccentric segment.

6. The device per claim 4, wherein the locking segment has a recess.

7. The device per claim 1, wherein the valve segment has a connection channel.

8. The device per claim 7, wherein the connection channel is a partial annular groove in an outer circumferential surface of the locking shaft.

9. The device per claim 8, wherein the partial annular groove is surrounded by at least one sealing element.

10. The device per claim 1, wherein the locking shaft has two valve segments, between which a locking segment is arranged.

11. The device per claim 10, wherein the locking shaft has a bypass mechanism for the two valve segments.

12. The device per claim 11, wherein the bypass mechanism has a bypass channel joining the two valve segments.

13. The device per claim 12, wherein the bypass channel extends inside the locking shaft and emerges into the two valve segments.

14. The device per claim 1, wherein the valve segment has at least one sealing element on either side.

15. The device per claim 2, wherein the recess in the male connection head has at least one recess surface.

16. The device per claim 2, wherein the recess is profiled.

17. The device per claim 15, wherein the recess has at least two recess surfaces which are displaced in height in the lengthwise direction of the recess.

18. The device per claim 4, wherein the locking segment of the locking shaft has at least one locking surface, engaging with a recess surface.

19. The device per claim 1, wherein the connection element has a catch, which engages with the locking shaft in the locking position and secures the locking shaft.

20. A cartridge for the device according to claim 1, comprising: the container to receive treatment agents for water, including filter means, and the male connection head arranged on the container for joining to the connection element, wherein the male connection head has at least one recess for engaging with the locking shaft arranged on the connection element.

21. The cartridge per claim 20, wherein the recess in the male connection head has at least two recess surfaces.

22. The cartridge per claim 20, wherein the recess is profiled.

23. The cartridge per claim 22, wherein the recess has at least two recess surfaces which are displaced in height in a lengthwise direction of the recess.

* * * * *